(12) United States Patent
Pezeshki et al.

(10) Patent No.: US 11,533,098 B2
(45) Date of Patent: Dec. 20, 2022

(54) SEMI-PERSISTENT CHANNEL STATE INFORMATION REPORTING

(71) Applicant: QUALCOMM Incorporated, San Diego, CA (US)

(72) Inventors: Hamed Pezeshki, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/115,288

(22) Filed: Dec. 8, 2020

(65) Prior Publication Data

US 2022/0182118 A1      Jun. 9, 2022

(51) Int. Cl.
*H04B 7/06* (2006.01)
*H04L 5/00* (2006.01)
*H04L 1/00* (2006.01)

(52) U.S. Cl.
CPC ......... *H04B 7/0626* (2013.01); *H04B 7/0639* (2013.01); *H04L 5/0051* (2013.01); *H04L 5/0055* (2013.01); *H04L 1/0003* (2013.01); *H04L 1/0026* (2013.01)

(58) Field of Classification Search
CPC ............... H04B 7/0626; H04B 7/0639; H04L 1/0026; H04L 5/0051; H04L 5/0055; H04L 5/0078; H04W 72/04; H04W 72/0413; H04W 72/042
See application file for complete search history.

(56) References Cited

U.S. PATENT DOCUMENTS

| | | | |
|---|---|---|---|
| 2019/0098523 A1* | 3/2019 | Muruganathan | H04L 5/0048 |
| 2020/0350967 A1* | 11/2020 | Xu | H04B 7/0632 |
| 2021/0152302 A1* | 5/2021 | Kwak | H04W 72/1231 |
| 2021/0266769 A1* | 8/2021 | Chung | H04W 72/0446 |
| 2021/0399866 A1* | 12/2021 | Li | H04L 1/0027 |

* cited by examiner

*Primary Examiner* — Pao Sinkantarakorn
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station via an uplink control channel, a negative acknowledgement (NACK) when a downlink shared channel transmission is not successfully received at the UE. The UE may receive, from the base station and based at least in part on the NACK, one or more channel state information reference signals (CSI-RSs) at one or more semi-persistent CSI measurement occasions. The UE may transmit, to the base station, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs. Numerous other aspects are provided.

30 Claims, 9 Drawing Sheets

SEMI-PERSISTENT CHANNEL STATE INFORMATION REPORTING

FIELD OF THE DISCLOSURE

Aspects of the present disclosure generally relate to wireless communication and to techniques and apparatuses for semi-persistent channel state information (CSI) reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting, to a base station via an uplink control channel, a negative acknowledgement (NACK) when a downlink shared channel transmission is not successfully received at the UE; receiving, from the base station and based at least in part on the NACK, one or more channel state information reference signals (CSI-RSs) at one or more semi-persistent CSI measurement occasions; and transmitting, to the base station, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs.

In some aspects, a method of wireless communication performed by a base station includes receiving, from a UE via an uplink control channel, a NACK when a downlink shared channel transmission is not successfully received at the UE; transmitting, to the UE and based at least in part on the NACK, one or more CSI-RSs at one or more semi-persistent CSI measurement occasions; and receiving, from the UE, one or more CSI reports at one or more semi-persistent CSI reporting occasions corresponding to the one or more semi-persistent CSI measurement occasions, wherein the one or more CSI reports includes one or more channel measurements based at least in part on the one or more CSI-RSs.

In some aspects, a UE for wireless communication includes a memory; and one or more processors operatively coupled to the memory, the memory and the one or more processors configured to: transmit, to a base station via an uplink control channel, a NACK when a downlink shared channel transmission is not successfully received at the UE; receive, from the base station and based at least in part on the NACK, one or more CSI-RSs at one or more semi-persistent CSI measurement occasions; and transmit, to the base station, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs.

In some aspects, a base station for wireless communication includes a memory; and one or more processors operatively coupled to the memory, the memory and the one or more processors configured to: receive, from a UE via an uplink control channel, a NACK when a downlink shared channel transmission is not successfully received at the UE; transmit, to the UE and based at least in part on the NACK, one or more CSI-RSs at one or more semi-persistent CSI measurement occasions; and receive, from the UE, one or more CSI reports at one or more semi-persistent CSI reporting occasions corresponding to the one or more semi-persistent CSI measurement occasions, wherein the one or more CSI reports includes one or more channel measurements based at least in part on the one or more CSI-RSs.

In some aspects, a non-transitory computer-readable medium storing a set of instructions for wireless communication includes one or more instructions that, when executed by one or more processors of a UE, cause the UE to: transmit, to a base station via an uplink control channel, a NACK when a downlink shared channel transmission is not successfully received at the UE; receive, from the base station and based at least in part on the NACK, one or more CSI-RSs at one or more semi-persistent CSI measurement occasions; and transmit, to the base station, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs.

In some aspects, a non-transitory computer-readable medium storing a set of instructions for wireless communication includes one or more instructions that, when executed by one or more processors of a base station, cause the base station to: receive, from a UE via an uplink control channel, a NACK when a downlink shared channel transmission is not successfully received at the UE; transmit, to the UE and based at least in part on the NACK, one or more CSI-RSs at one or more semi-persistent CSI measurement occasions; and receive, from the UE, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs.

In some aspects, an apparatus for wireless communication includes means for transmitting, to a base station via an uplink control channel, a NACK when a downlink shared channel transmission is not successfully received at the apparatus; means for receiving, from the base station and based at least in part on the NACK, one or more CSI-RSs at one or more semi-persistent CSI measurement occasions; and means for transmitting, to the base station, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs.

In some aspects, an apparatus for wireless communication includes means for receiving, from a UE via an uplink control channel, a NACK when a downlink shared channel transmission is not successfully received at the UE; means for transmitting, to the UE and based at least in part on the NACK, one or more CSI-RSs at one or more semi-persistent CSI measurement occasions; and means for receiving, from the UE, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
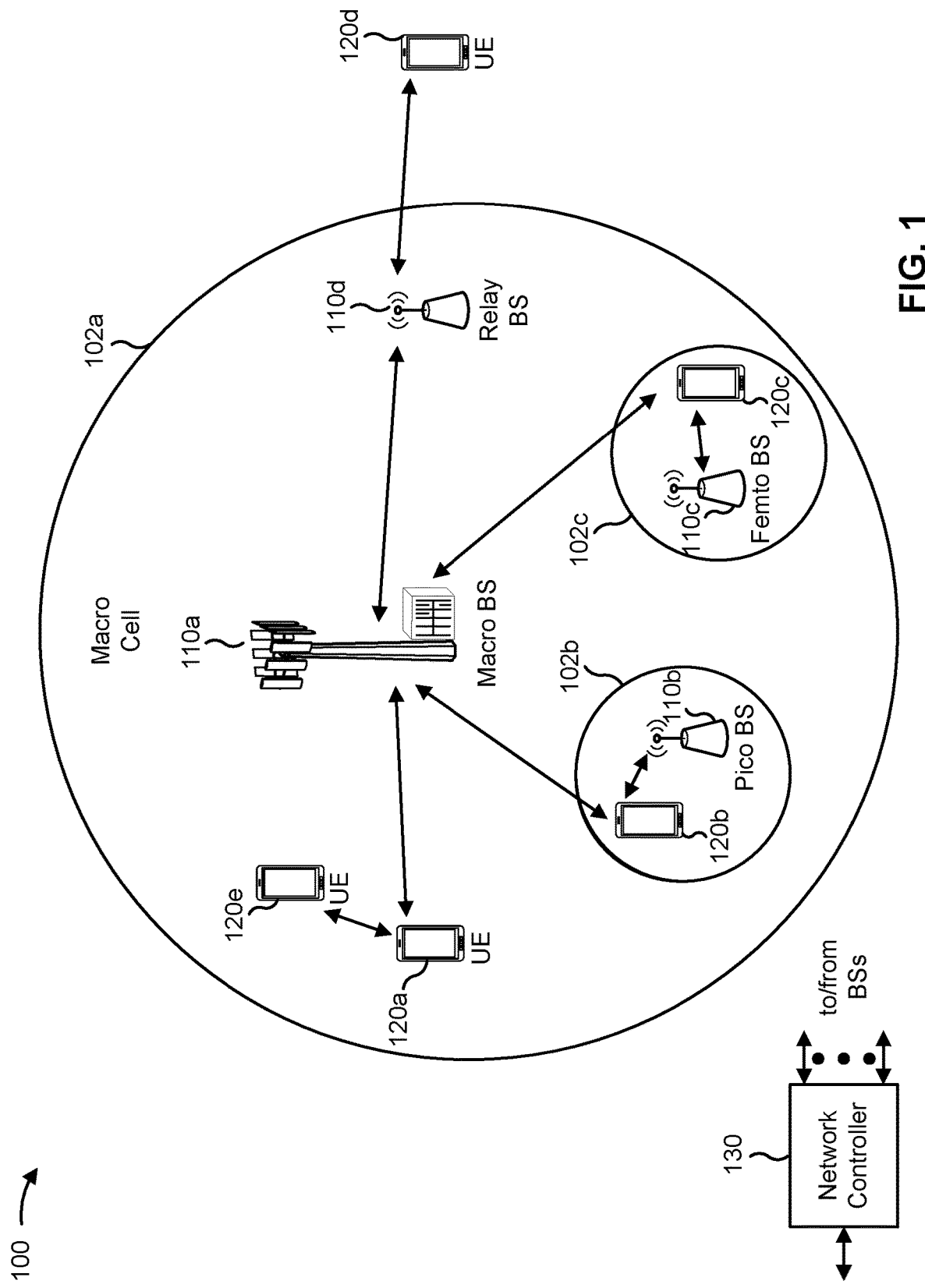
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
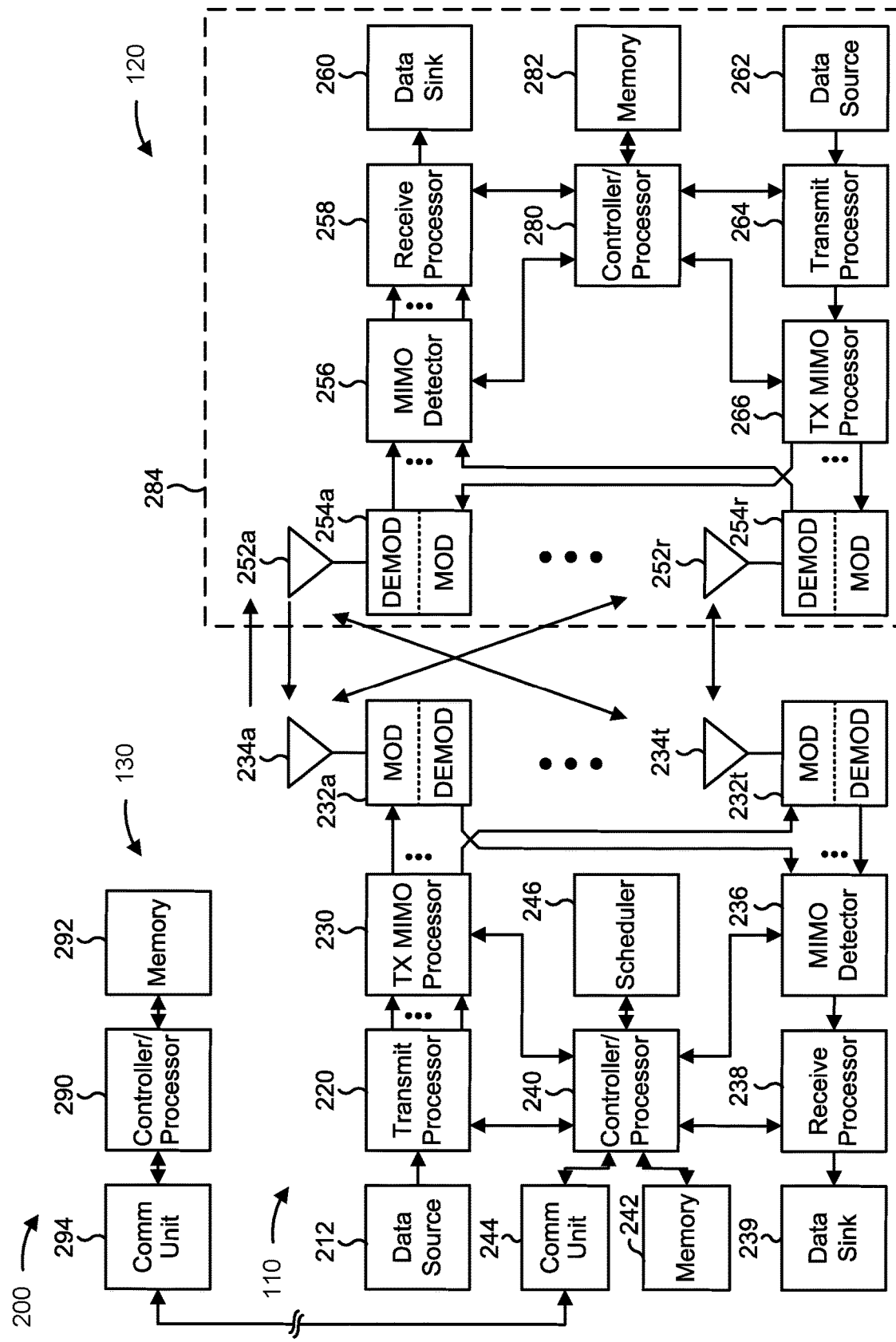
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-7.

Controller/processor 240 of base station 110, controller/processor 280 of UE 120, and/or any other component(s) of FIG. 2 may perform one or more techniques associated with semi-persistent channel state information (CSI) reporting, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a UE includes means for transmitting, to a base station via an uplink control channel, a negative acknowledgement (NACK) when a downlink shared channel transmission is not successfully received at the UE; means for receiving, from the base station and based at least in part on the NACK, one or more CSI reference signals (CSI-RSs) at one or more semi-persistent CSI measurement occasions; and/or means for transmitting, to the base station, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving, from the base station, a medium access control (MAC) control element (CE) that activates a plurality of semi-persistent CSI occasions.

In some aspects, the UE includes means for receiving, from the base station, a parameter that defines a quantity associated with the plurality of semi-persistent CSI occasions.

In some aspects, the UE includes means for receiving, from the base station, a data transmission or a data retransmission based at least in part on the one or more CSI reports, wherein the data transmission or the data retransmission is associated with one or more of an adjusted modulation and coding scheme, an adjusted precoding matrix indicator, or an adjusted rank indicator based at least in part on the one or more CSI reports.

In some aspects, a base station includes means for receiving, from a UE via an uplink control channel, a NACK when a downlink shared channel transmission is not successfully received at the UE; means for transmitting, to the UE and based at least in part on the NACK, one or more CSI-RSs at one or more semi-persistent CSI measurement occasions; and/or means for receiving, from the UE, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting, to the UE, a MAC-CE that activates a plurality of semi-persistent CSI occasions.

In some aspects, the base station includes means for transmitting, to the UE, a parameter that defines a quantity associated with the plurality of semi-persistent CSI occasions.

In some aspects, the base station includes means for modifying, based at least in part on the one or more CSI reports, one or more of an MCS, a precoding matrix indicator (PMI), or a rank indicator (RI).

In some aspects, the base station includes means for performing, with the UE, a data transmission or a data retransmission based at least in part on one or more of the MCS, the PMI, or the RI.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A base station may transmit, to a UE, a MAC-CE to activate semi-persistent CSI measurement and reporting occasions. The semi-persistent CSI measurement and reporting occasions may be configured occasions for CSI measurement and reporting. A semi-persistent CSI measurement occasion may have a corresponding semi-persistent reporting occasion. The semi-persistent CSI measurement and reporting occasions may occur in a periodic manner. The semi-persistent CSI measurement and reporting occasions may be activated based at least in part on the MAC-CE transmitted by the base station, and the UE may perform CSI measurement and reporting using the semi-persistent CSI measurement and reporting occasions.

Figure 3:
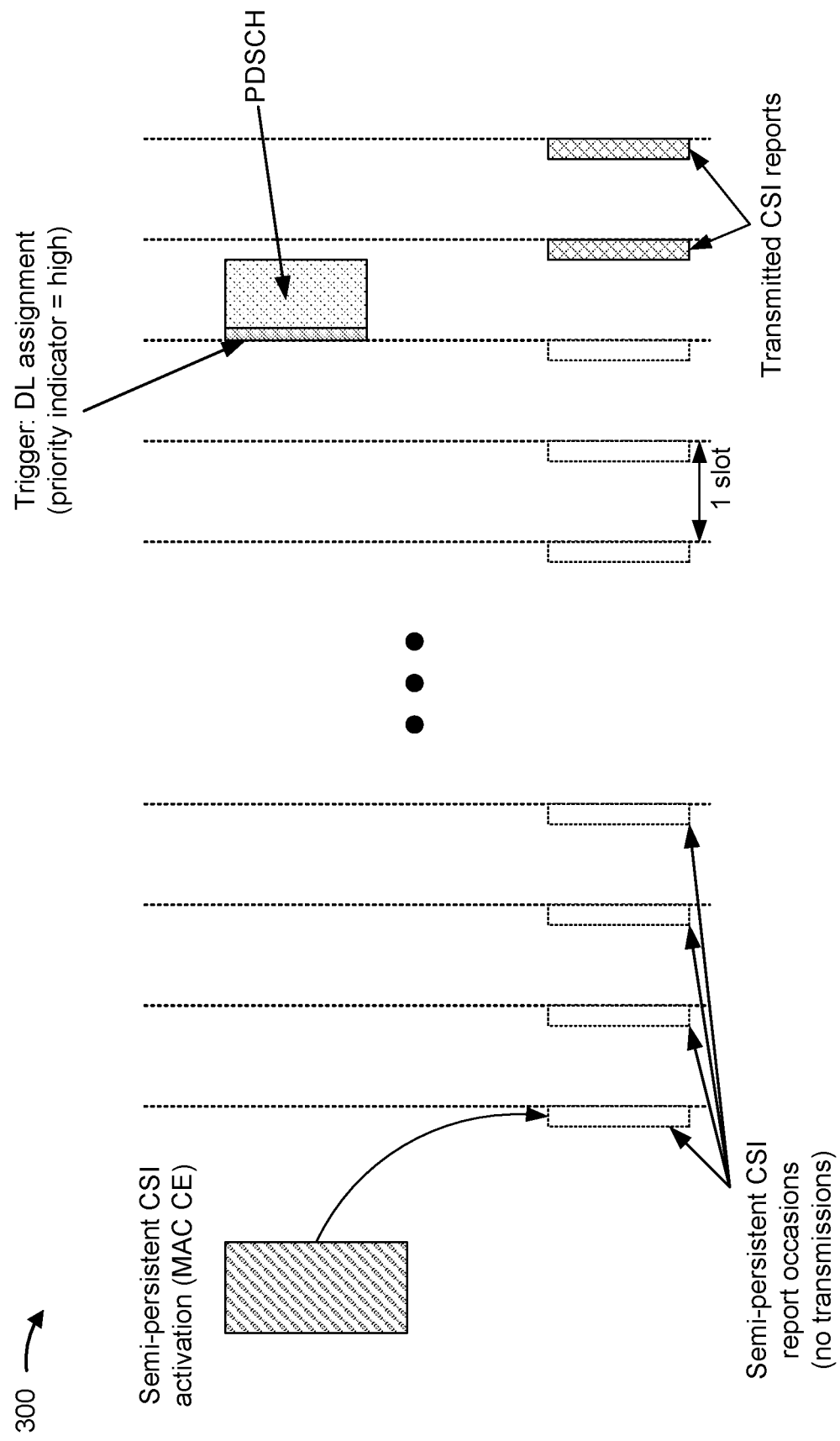
FIGS. 3-5 are diagrams illustrating examples associated with semi-persistent channel state information (CSI) reporting, in accordance with various aspects of the present disclosure.

FIG. 3 is a diagram illustrating an example 300 associated with semi-persistent CSI reporting, in accordance with various aspects of the present disclosure.

As shown in FIG. 3, a base station may transmit, to a UE, a MAC-CE to activate semi-persistent CSI measurement and reporting occasions. The semi-persistent CSI measurement and reporting occasions may be configured occasions for CSI measurement and reporting. The semi-persistent CSI measurement and reporting occasions may occur in a periodic manner. The UE may be notified of the semi-persistent CSI measurement and reporting occasions based at least in part on the MAC-CE, but the UE may not necessarily perform CSI measurement and reporting on all of the semi-persistent CSI measurement and reporting occasions.

Rather, the UE may begin performing CSI measurements and CSI reporting using the semi-persistent CSI measurement and reporting occasions only after receiving, from the base station, downlink control information (DCI) with a priority indicator set to high. The DCI may be received via a physical downlink shared channel (PDSCH). The DCI may request that the UE perform CSI measurements and CSI reporting using a subsequent number of semi-persistent CSI measurement and reporting occasions, or the DCI may explicitly trigger the UE to perform CSI measurements and CSI reporting using a subsequent number of semi-persistent CSI measurement and reporting occasions. The subsequent number of semi-persistent CSI measurement and reporting occasions may be a dynamic parameter configured by the base station. The subsequent number of semi-persistent CSI measurement and reporting occasions may be subsequent to the DCI. Since the UE waits until the DCI is received to use the semi-persistent CSI measurement and reporting occasions, and the DCI may be associated with the PDSCH, the UE may perform CSI measurements and CSI reporting when active traffic is present between the UE and the base station. When there is no active traffic present between the UE and the base station, the UE does not use the semi-persistent CSI measurement and reporting occasions.

As an example, DCI including a priority indicator set to high may request that the UE, or trigger the UE to, perform CSI measurements and CSI reporting on two subsequent semi-persistent CSI measurement and reporting occasions. The UE may perform CSI measurements on two subsequent semi-persistent CSI measurement occasions based at least in part on the DCI. Further, the UE may perform CSI reporting on two subsequent semi-persistent CSI reporting occasions based at least in part on the DCI. In other words, in this example, the UE may measure a first CSI using a first semi-persistent CSI measurement occasion, and the UE may transmit a first CSI report using a first semi-persistent CSI reporting occasion corresponding to the first semi-persistent CSI measurement occasion. Further, the UE may measure a second CSI using a second semi-persistent CSI measurement occasion, and the UE may transmit a second CSI report using a second semi-persistent CSI reporting occasion corresponding to the second semi-persistent CSI measurement occasion.

As indicated above, FIG. 3 is provided as an example. Other examples may differ from what is described with regard to FIG. 3.

A UE may receive, from the base station, DCI with a priority indicator set to high, which may cause the UE to perform CSI measurement and reporting at one or more semi-persistent CSI measurement and reporting occasions. By performing the CSI measurement and reporting after receiving the DCI and an associated PDSCH, the UE may perform the CSI measurement and reporting when there is active traffic between the UE and the base station. However, this solution does not cover the situation in which the UE transmits a NACK to the base station based at least in part on a downlink shared channel transmission not being successfully received or decoded at the UE, which may increase a likelihood of a retransmission or a new transmission via the downlink shared channel.

In various aspects of techniques and apparatuses described herein, a UE may transmit, to a base station via a physical uplink control channel (PUCCH), a NACK. The UE may transmit the NACK via uplink control signaling. The UE may transmit the NACK based at least in part on a downlink shared channel transmission that is not successfully received or decoded at the UE. The UE may receive, from the base station and based at least in part on the NACK, one or more CSI-RSs at one or more semi-persistent CSI measurement occasions that occur subsequent to the NACK transmission. The UE may transmit, to the base station, one or more CSI reports at one or more semi-persistent CSI reporting occasions corresponding to the one or more semi-persistent CSI measurement occasions, where the one or more CSI reports may include one or more channel measurements based at least in part on the one or more CSI-RSs. In some aspects, the NACK and a semi-persistent CSI measurement occasion associated with a CSI-RS may be separated by a quantity of symbols based at least in part on a processing time of the base station. In some aspects, the UE may receive multiple CSI-RSs and transmit multiple corresponding CSI-reports based at least in part on a parameter received from the base station.

Figure 4:
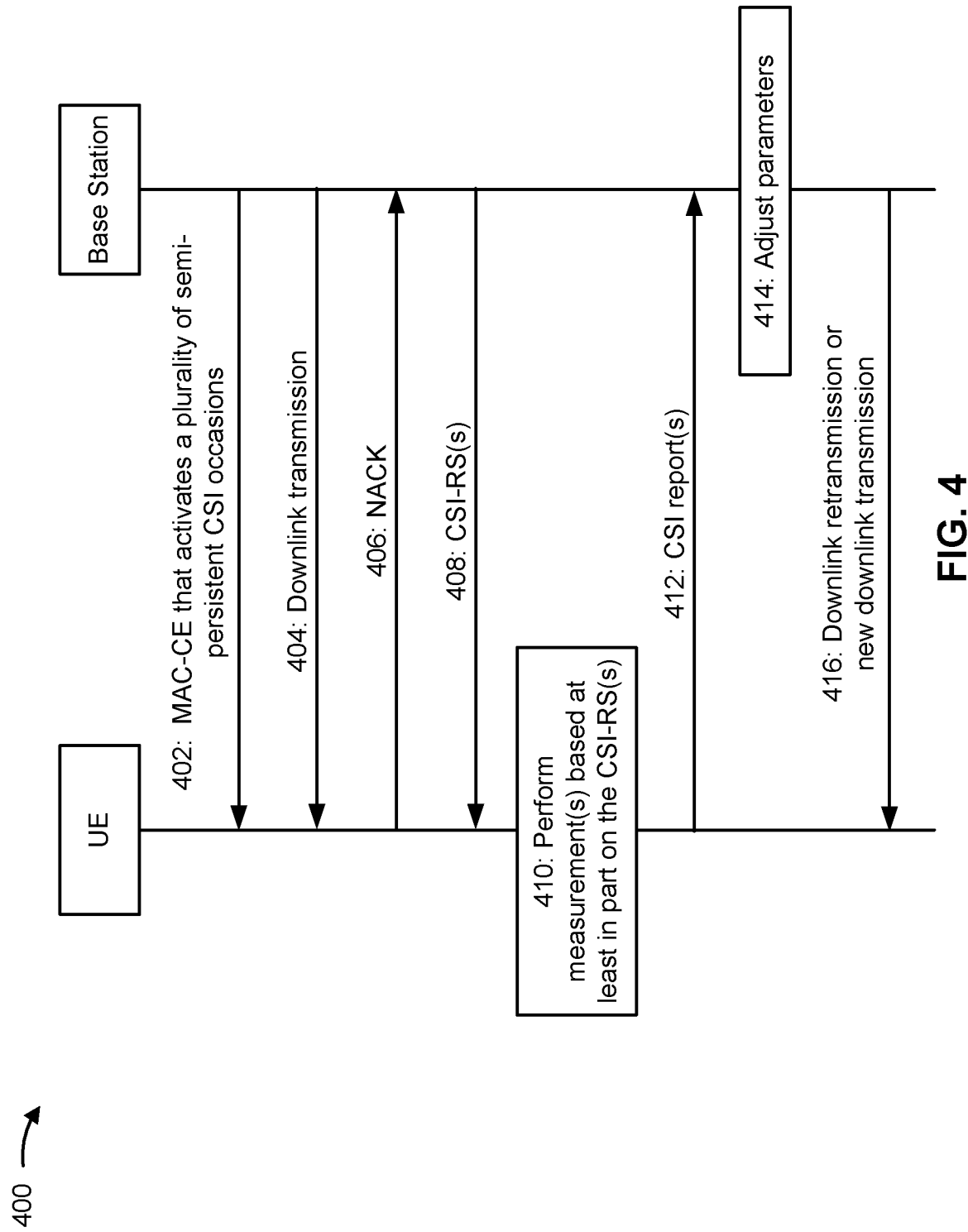

FIG. 4 is a diagram illustrating an example 400 associated with semi-persistent CSI reporting, in accordance with various aspects of the present disclosure. As shown in FIG. 4, example 400 includes communication between a UE (e.g., UE 120) and a base station (e.g., base station 110). In some aspects, the UE and the base station may be included in a wireless network such as wireless network 100. The UE and the base station may communicate on a wireless sidelink.

As shown by reference number 402, the UE may receive, from the base station, a MAC-CE that activates a plurality of semi-persistent CSI measurement and reporting occasions. A semi-persistent CSI measurement occasion may have a corresponding semi-persistent CSI reporting occasion. The semi-persistent CSI measurement and reporting occasions may be configured occasions for CSI measurement and reporting. The semi-persistent CSI measurement and reporting occasions may occur in a periodic manner. The UE may be notified that the semi-persistent CSI measurement and reporting occasions are activated based at least in part on the MAC-CE, but the UE may not necessarily perform CSI measurements and CSI reporting on all of the semi-persistent CSI measurement and reporting occasions. Rather, the semi-persistent CSI measurement and reporting occasions may be available to the UE for CSI measurement and reporting.

As described below, the plurality of semi-persistent CSI measurement and reporting occasions configured by the base station may be used by the UE for performing CSI measurements and CSI reporting.

As shown by reference number 404, the base station may perform a downlink transmission with the UE. For example, the base station may transmit downlink data via a PDSCH. The downlink data may not be successfully received or decoded at the UE.

As shown by reference number 406, the UE may transmit a NACK to the base station based at least in part on the downlink data not being successfully received or decoded at the UE. The UE may transmit the NACK via a PUCCH As shown by reference number 408, the base station may transmit one or more CSI-RSs at one or more semi-persistent CSI measurement occasions that occur subsequent to the NACK transmission. The base station may transmit the one or more CSI-RSs based at least in part on the NACK received from the UE. In other words, based at least in part on the MAC-CE received from the base station, the UE may use one or more of the semi-persistent CSI measurement occasions to receive the one or more CSI-RSs from the base station.

In some aspects, the UE may receive the one or more CSI-RSs from the base station based at least in part on the NACK transmitted from the UE to the base station. In some aspects, the NACK may be included in a plurality of NACKs transmitted over the PUCCH, and a quantity associated with the plurality of NACKs may satisfy a threshold. In some aspects, the NACK may be associated with NACK bits, and a percentage of bits transmitted over the PUCCH corresponding to NACK bits may satisfy a threshold.

As shown by reference number 410, the UE may perform one or more CSI measurements based at least in part on the one or more CSI-RSs received from the base station. The one or more CSI measurements may define channel conditions between the UE and the base station.

As shown by reference number 412, the UE may transmit, to the base station, one or more CSI reports at one or more semi-persistent CSI reporting occasions corresponding to the one or more semi-persistent CSI measurement occasions associated with the one or more CSI-RSs. In other words, the UE may perform the CSI measurement and the CSI reporting in the corresponding semi-persistent CSI measurement and reporting occasions.

In some aspects, the base station may transmit a quantity of CSI-RSs at a quantity of semi-persistent CSI measurement occasions, respectively, that occur subsequent to the NACK transmission. The UE may transmit a quantity of CSI reports at a quantity of semi-persistent CSI reporting occasions, respectively. In some aspects, the quantity of semi-persistent CSI measurement occasions and the quantity of corresponding semi-persistent CSI reporting occasions may be predefined for the UE or configured by the base station. For example, the UE may receive, from the base station, a parameter that defines the quantity of semi-persistent CSI measurement and reporting occasions.

As an example, the base station may transmit a first CSI-RS at a first semi-persistent CSI measurement occasion that occurs after the NACK, the base station may transmit a second CSI-RS at a second semi-persistent CSI measurement occasion that occurs after the first semi-persistent CSI measurement occasion, and so on. The UE may transmit a first CSI report at a first semi-persistent CSI reporting occasion corresponding to the first semi-persistent CSI measurement occasion, the UE may transmit a second CSI report at a second semi-persistent CSI reporting occasion corresponding to the second semi-persistent CSI measurement occasion, and so on.

In some aspects, the NACK and a semi-persistent CSI measurement occasion associated with a CSI-RS (e.g., a first semi-persistent CSI measurement occasion associated with a first CSI-RS) may be separated by a quantity of symbols. The quantity of symbols, as represented by Z in FIG. 5, may be based at least in part on a processing time of the base station.

As shown by reference number 414, the base station may adjust one or more transmission parameters based at least in part on the one or more CSI reports. For example, the base station may adjust a modulation and coding scheme (MCS), a precoding matrix indicator (PMI), and/or a rank indicator (RI) based at least in part on the one or more CSI reports. The base station may determine an adjusted MCS, an adjusted PMI, and/or an adjusted RI based at least in part on the one or more CSI reports.

As shown by reference number 416, the UE may receive, from the base station, a data retransmission or a new data transmission based at least in part on the one or more CSI reports. The data retransmission or the new data transmission may occur over the PDSCH. For example, the data retransmission or the new data transmission may be associated with the adjusted MCS, the adjusted PMI, and/or the adjusted RI based at least in part on the one or more CSI reports.

In some aspects, the UE may not perform CSI measurement and reporting on the plurality of semi-persistent CSI measurement and reporting occasions activated by the base station via the MAC-CE, which may save power at the UE. The UE may perform the CSI measurement and reporting after transmitting the NACK, which may result in a downlink data retransmission from the base station or a new downlink data transmission. Further, the base station may transmit the CSI-RS(s) on one or more semi-persistent CSI measurement occasions after receiving the NACK, and may not transmit the CSI-RS(s) otherwise, which may reduce overhead signaling between the UE and the base station.

As indicated above, FIG. 4 is provided as an example. Other examples may differ from what is described with regard to FIG. 4.

Figure 5:
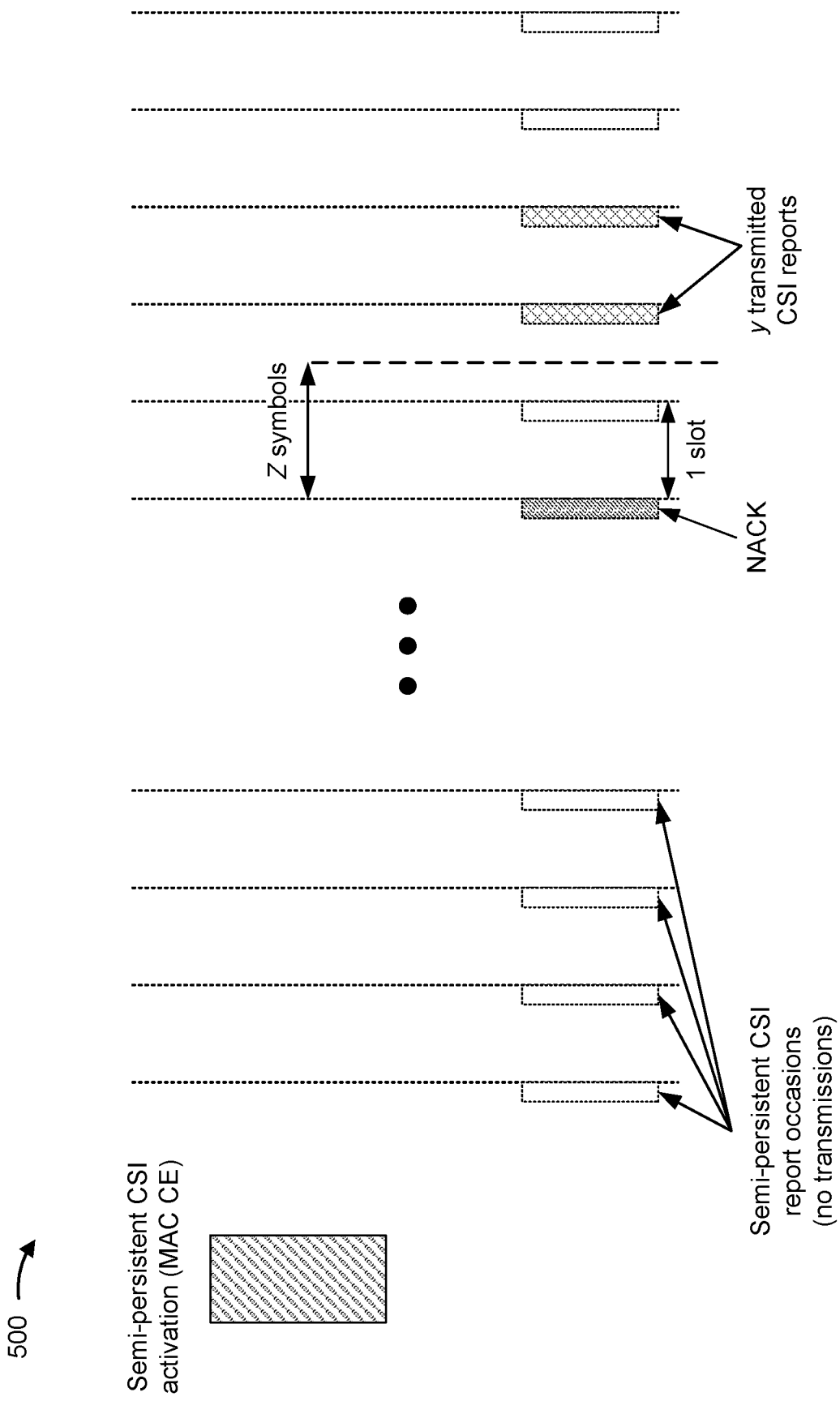

FIG. 5 is a diagram illustrating an example 500 associated with semi-persistent CSI reporting, in accordance with various aspects of the present disclosure.

As shown in FIG. 5, a base station may transmit, to a UE, a MAC-CE to activate semi-persistent CSI measurement and reporting occasions. The semi-persistent CSI measurement and reporting occasions may be configured occasions for CSI measurement and reporting. The semi-persistent CSI measurement and reporting occasions may occur in a periodic manner. When a downlink transmission is not successfully received or decoded at the UE, the UE may transmit a NACK to the base station. The UE may transmit the NACK via a PUCCH.

In some aspects, after transmitting the NACK via the PUCCH, or when the PUCCH includes at least a defined quantity of NACKs or a defined quantity of NACK bits, the UE may measure CSI-RS(s) at a next $\gamma$ semi-persistent CSI measurement occasions and transmit CSI report(s) at corresponding $\gamma$ semi-persistent CSI reporting occasions. The CSI report(s) may be MAC-CE activated and NACK triggered semi-persistent CSI report(s).

In some aspects, a first semi-persistent CSI measurement occasion in the $\gamma$ semi-persistent CSI measurement occasions may be at least Z symbols from an end of the NACK, which may provide the base station with sufficient processing time to process the NACK and transmit the CSI-RS(s) at they semi-persistent CSI measurement occasions. The parameter $\gamma$ may be predefined for the UE or configured by the base station. The base station may adjust an MCS, PMI, and/or RI based at least in part on the CSI report(s), and use the adjusted MCS, PMI, and/or RI for performing downlink data retransmission(s) or new downlink data transmission(s).

As indicated above, FIG. 5 is provided as an example. Other examples may differ from what is described with regard to FIG. 5.

Figure 6:
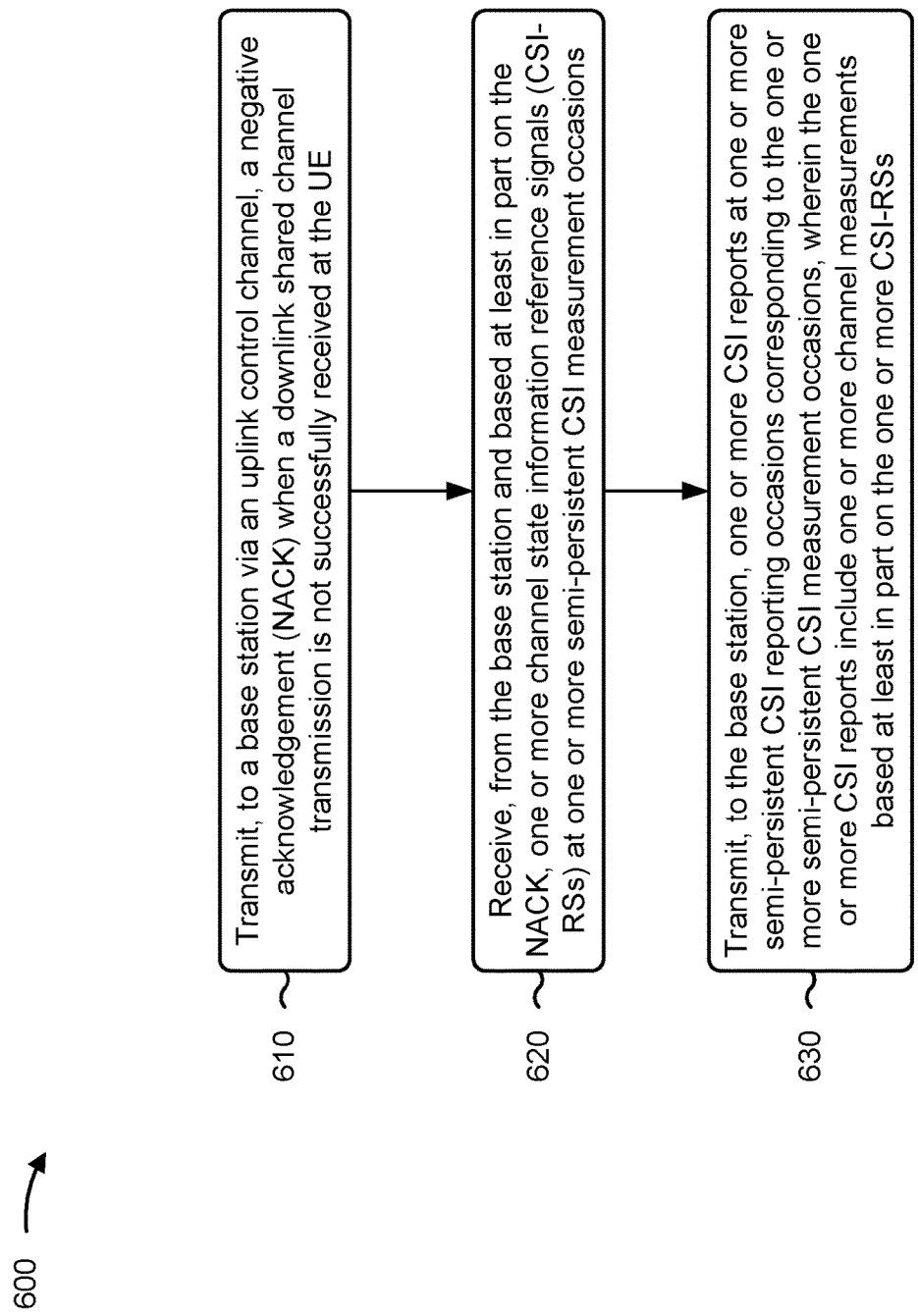
FIGS. 6-7 are diagrams illustrating example processes associated with semi-persistent CSI reporting, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120) performs operations associated with semi-persistent CSI reporting.

As shown in FIG. 6, in some aspects, process 600 may include transmitting, to a base station via an uplink control channel, a when a downlink shared channel transmission is not successfully received at the UE (block 610). For example, the UE (e.g., using transmission component 804, depicted in FIG. 8) may transmit, to a base station via an uplink control channel, a NACK when a downlink shared channel transmission is not successfully received at the UE, as described above.

As further shown in FIG. 6, in some aspects, process 600 may include receiving, from the base station and based at least in part on the NACK, one or more CSI-RSs at one or more semi-persistent CSI measurement occasions (block 620). For example, the UE (e.g., using reception component 802, depicted in FIG. 8) may receive, from the base station and based at least in part on the NACK, one or more CSI-RSs at one or more semi-persistent CSI measurement occasions, as described above.

As further shown in FIG. 6, in some aspects, process 600 may include transmitting, to the base station, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs (block 630). For example, the UE (e.g., using transmission component 804, depicted in FIG. 8) may transmit, to the base station, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs, as described above.

Process 600 may include additional aspects, such as any single aspect or any combination of aspects described below and/or in connection with one or more other processes described elsewhere herein.

In a first aspect, process 600 includes receiving, from the base station, a MAC-CE that activates a plurality of semi-persistent CSI occasions including the one or more semi-persistent CSI measurement occasions, and the one or more semi-persistent CSI reporting occasions corresponding to the one or more semi-persistent CSI measurement occasions.

In a second aspect, alone or in combination with the first aspect, process 600 includes receiving, from the base station, a parameter that defines a quantity associated with the plurality of semi-persistent CSI occasions.

In a third aspect, alone or in combination with one or more of the first and second aspects, the NACK is included in a plurality of NACKs transmitted over the uplink control channel, and a number associated with the plurality of NACKs satisfies a threshold.

In a fourth aspect, alone or in combination with one or more of the first through third aspects, the NACK is associated with NACK bits, and a percentage of bits transmitted over the uplink control channel corresponding to NACK bits satisfies a threshold.

In a fifth aspect, alone or in combination with one or more of the first through fourth aspects, the NACK and the one or more semi-persistent CSI measurement occasions associated with the one or more CSI-RSs are separated by a quantity of symbols based at least in part on a processing time of the base station.

In a sixth aspect, alone or in combination with one or more of the first through fifth aspects, process 600 includes receiving, from the base station, a data transmission or a data retransmission based at least in part on the one or more CSI reports, wherein the data transmission or the data retransmission is associated with one or more of an adjusted modulation and coding scheme, an adjusted precoding matrix indicator, or an adjusted rank indicator based at least in part on the one or more CSI reports.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
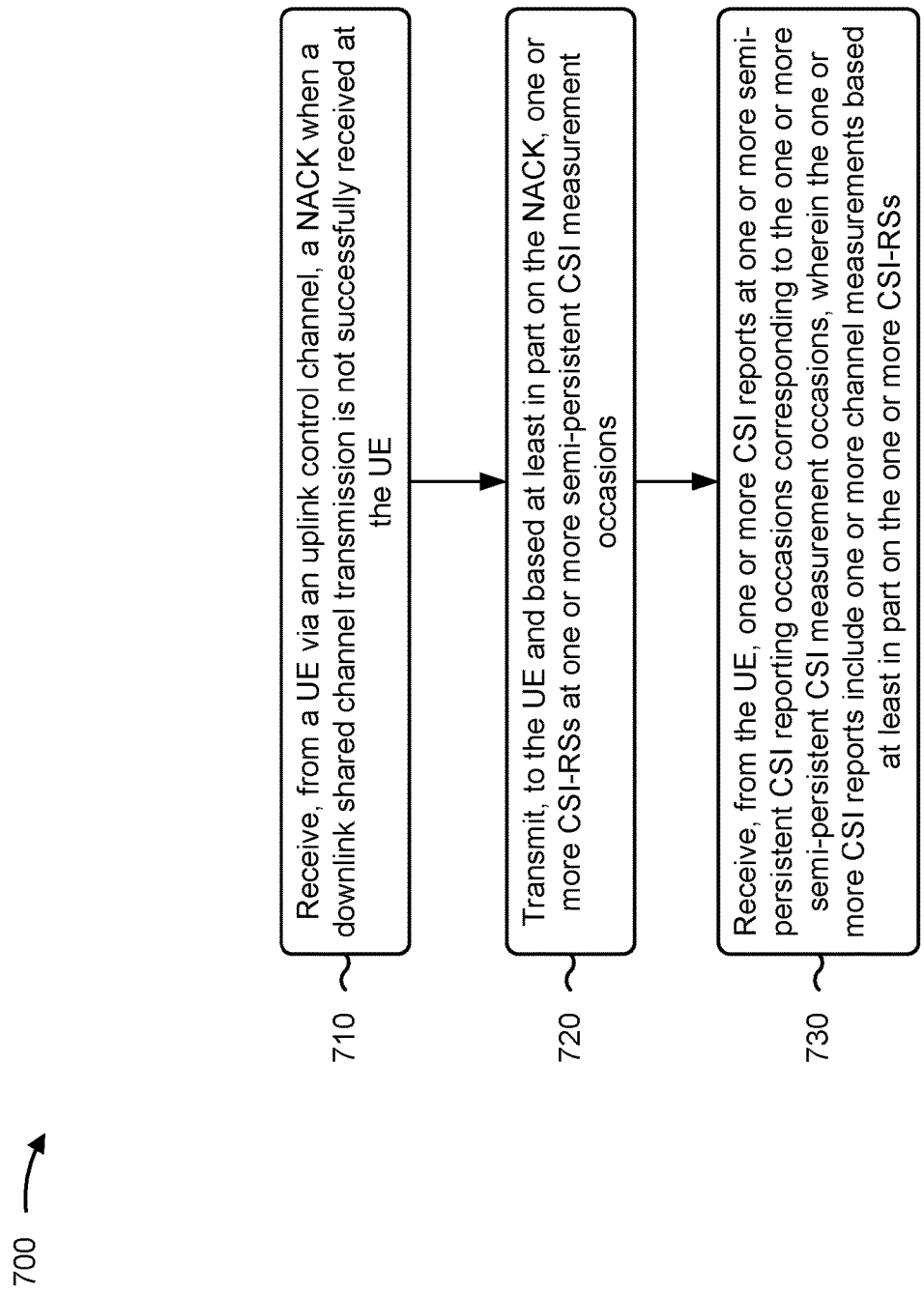

FIG. 7 is a diagram illustrating an example process 700 performed, for example, by a base station, in accordance with various aspects of the present disclosure. Example process 700 is an example where the base station (e.g., base station 110) performs operations associated with semi-persistent CSI reporting.

As shown in FIG. 7, in some aspects, process 700 may include receiving, from a UE via an uplink control channel, a NACK when a downlink shared channel transmission is not successfully received at the UE (block 710). For example, the base station (e.g., using reception component 902, depicted in FIG. 9) may receive, from a UE via an uplink control channel, a NACK when a downlink shared channel transmission is not successfully received at the UE, as described above.

As further shown in FIG. 7, in some aspects, process 700 may include transmitting, to the UE and based at least in part on the NACK, one or more CSI-RSs at one or more semi-persistent CSI measurement occasions (block 720). For example, the base station (e.g., using transmission component 904, depicted in FIG. 9) may transmit, to the UE and based at least in part on the NACK, one or more CSI-RSs at one or more semi-persistent CSI measurement occasions, as described above.

As further shown in FIG. 7, in some aspects, process 700 may include receiving, from the UE, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs (block 730). For example, the base station (e.g., using reception component 902, depicted in FIG. 9) may receive, from the UE, one or more CSI reports at one or more semi-persistent CSI reporting occasions corresponding to the one or more semi-persistent CSI measurement occasions, wherein the one or more CSI report include one or more channel measurements based at least in part on the one or more CSI-RSs, as described above.

Process 700 may include additional aspects, such as any single aspect or any combination of aspects described below and/or in connection with one or more other processes described elsewhere herein.

In a first aspect, process 700 includes transmitting, to the UE, a MAC-CE that activates a plurality of semi-persistent CSI occasions including the one or more semi-persistent CSI measurement occasions, and the one or more semi-persistent CSI reporting occasions corresponding to the one or more semi-persistent CSI measurement occasions.

In a second aspect, alone or in combination with the first aspect, process 700 includes transmitting, to the UE, a parameter that defines a quantity associated with the plurality of semi-persistent CSI occasions.

In a third aspect, alone or in combination with one or more of the first and second aspects, the NACK is included in a plurality of NACKs transmitted over the uplink control channel, and a number associated with the plurality of NACKs satisfies a threshold.

In a fourth aspect, alone or in combination with one or more of the first through third aspects, the NACK is associated with NACK bits, and a percentage of bits transmitted over the uplink control channel corresponding to NACK bits satisfies a threshold.

In a fifth aspect, alone or in combination with one or more of the first through fourth aspects, the NACK and the one or more semi-persistent CSI measurement occasions associated with the one or more CSI-RSs are separated by a quantity of symbols based at least in part on a processing time of the base station.

In a sixth aspect, alone or in combination with one or more of the first through fifth aspects, process 700 includes modifying, based at least in part on the one or more CSI reports, one or more of an MCS, a PMI, or a RI.

In a seventh aspect, alone or in combination with one or more of the first through sixth aspects, process 700 includes performing, with the UE, a data transmission or a data retransmission based at least in part on one or more of the MCS, the PMI, or the RI.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
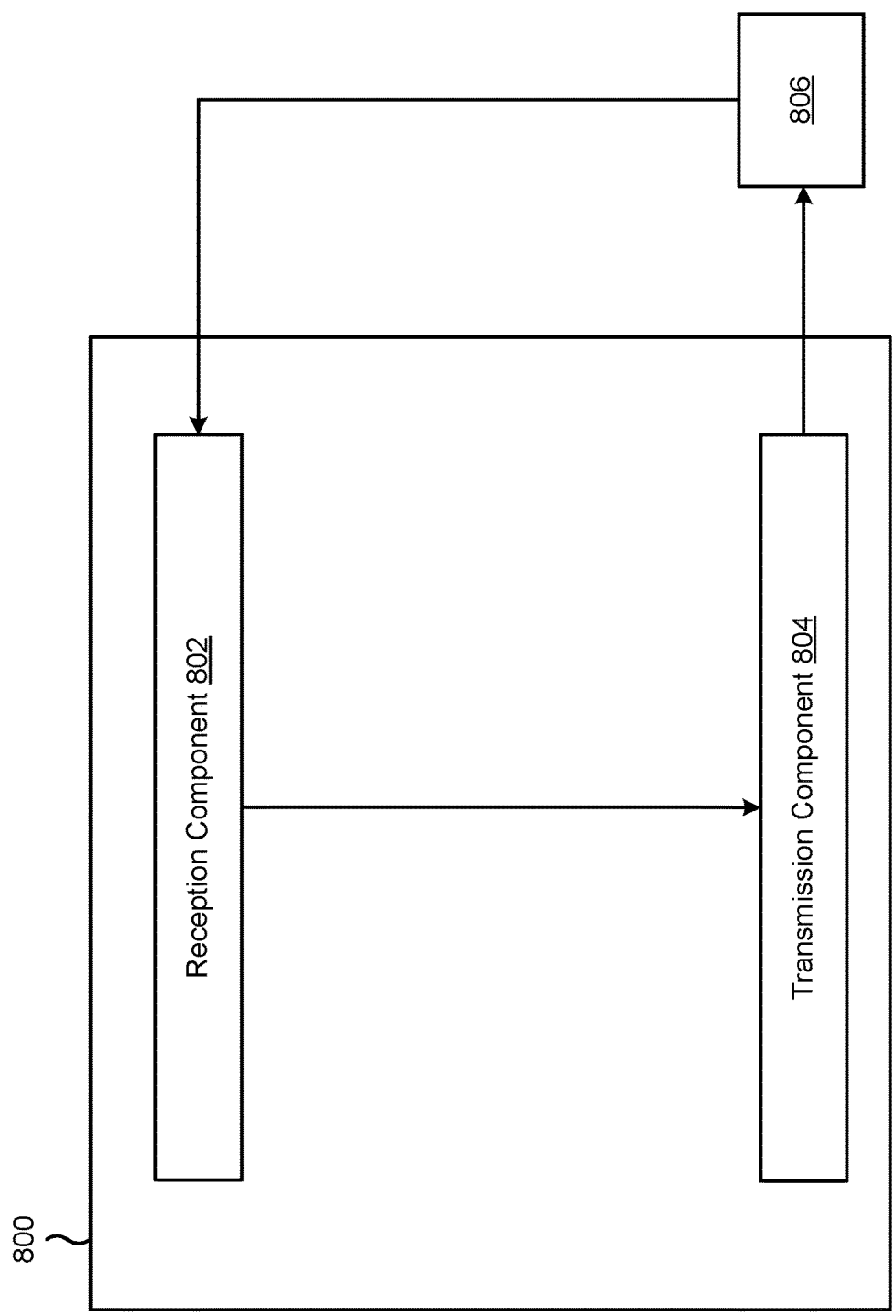
FIGS. 8-9 are block diagrams of example apparatuses for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIGS. 4-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The transmission component 804 may transmit, to a base station via an uplink control channel, a NACK when a downlink shared channel transmission is not successfully received at the UE. The reception component 802 may receive, from the base station and based at least in part on the NACK, one or more CSI-RSs at one or more semi-persistent CSI measurement occasions. The transmission component 804 may transmit, to the base station, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs.

The reception component 802 may receive, from the base station, a MAC-CE that activates a plurality of semi-persistent CSI occasions including the one or more semi-persistent CSI measurement occasions, and the one or more semi-persistent CSI reporting occasions corresponding to the one or more semi-persistent CSI measurement occasions.

The reception component 802 may receive, from the base station, a parameter that defines a quantity associated with the plurality of semi-persistent CSI occasions.

The reception component 802 may receive, from the base station, a data transmission or a data retransmission based at least in part on the one or more CSI reports, wherein the data transmission or the data retransmission is associated with one or more of an adjusted modulation and coding scheme, an adjusted precoding matrix indicator, or an adjusted rank indicator based at least in part on the one or more CSI reports.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
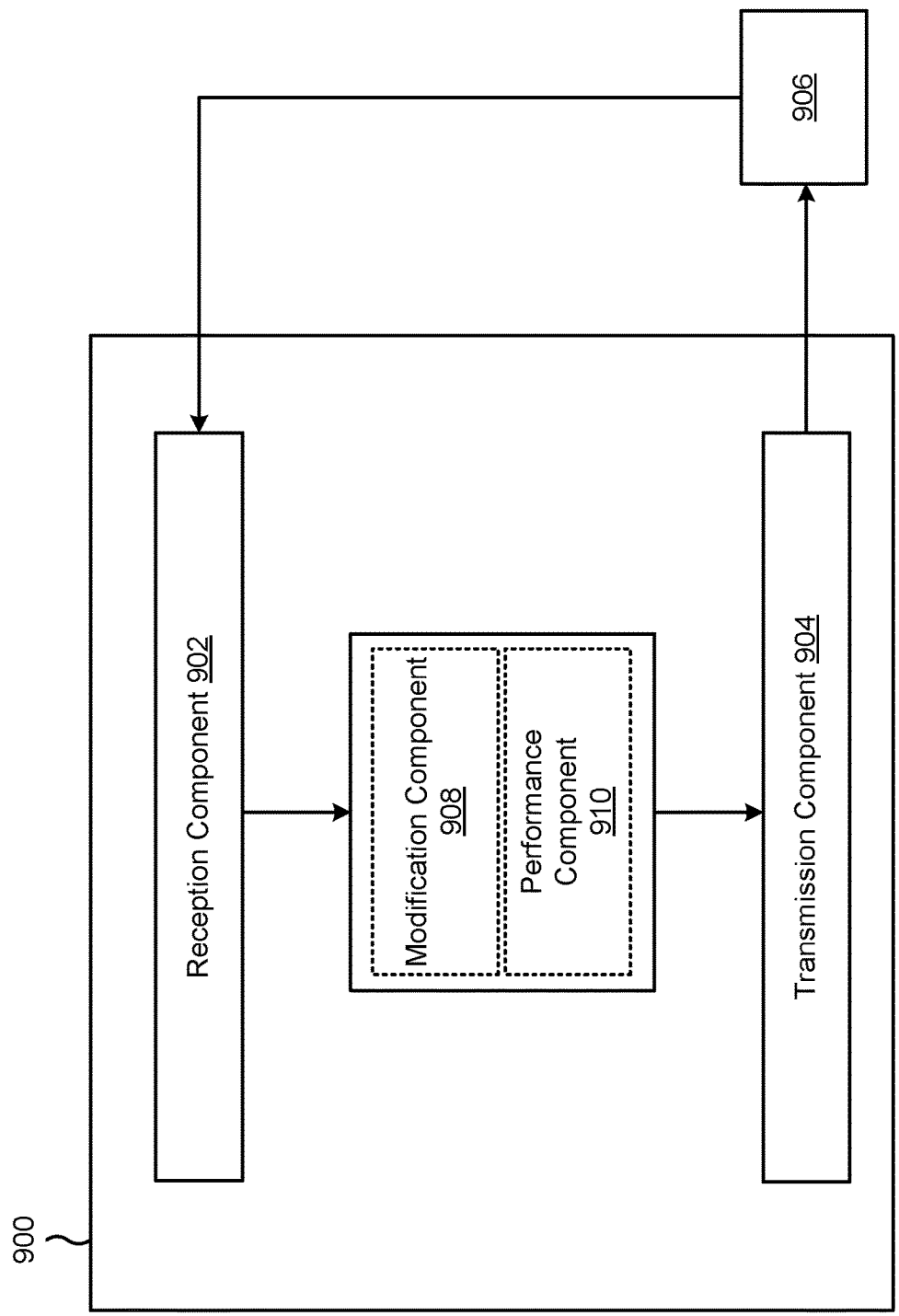

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a modification component 908, or a performance component 910, among other examples.

In some aspects, the apparatus 900 may be configured to perform one or more operations described herein in connection with FIGS. 4-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The reception component 902 may receive, from a UE via an uplink control channel, a NACK when a downlink shared channel transmission is not successfully received at the UE. The transmission component 904 may transmit, to the UE and based at least in part on the NACK, one or more CSI-RSs at one or more semi-persistent CSI measurement occasions. The reception component 902 may receive, from the UE, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs.

The transmission component 904 may transmit, to the UE, a MAC-CE that activates a plurality of semi-persistent CSI occasions including the one or more semi-persistent CSI measurement occasions, and the one or more semi-persistent CSI reporting occasions corresponding to the one or more semi-persistent CSI measurement occasions.

The transmission component 904 may transmit, to the UE, a parameter that defines a quantity associated with the plurality of semi-persistent CSI occasions.

The modification component 908 may modify, based at least in part on the one or more CSI reports, one or more of an MCS, a PMI, or a RI.

The performance component 910 may perform, with the UE, a data transmission or a data retransmission based at least in part on one or more of the MCS, the PMI, or the RI.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of aspects of the present disclosure:

Aspect 1: A method of wireless communication performed by a user equipment (UE), comprising: transmitting, to a base station via an uplink control channel, a negative acknowledgement (NACK) when a downlink shared channel transmission is not successfully received at the UE; receiving, from the base station and based at least in part on the NACK, one or more channel state information reference signals (CSI-RSs) at one or more semi-persistent CSI measurement occasions; and transmitting, to the base station, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs.

Aspect 2: The method of aspect 1, further comprising: receiving, from the base station, a medium access control (MAC) control element (CE) that activates a plurality of semi-persistent CSI occasions including: the one or more semi-persistent CSI measurement occasions; and the one or more semi-persistent CSI reporting occasions corresponding to the one or more semi-persistent CSI measurement occasions.

Aspect 3: The method of aspect 2, further comprising: receiving, from the base station, a parameter that defines a quantity associated with the plurality of semi-persistent CSI occasions.

Aspect 4: The method of any of aspects 1 through 3, wherein the NACK is included in a plurality of NACKs transmitted over the uplink control channel, and a number associated with the plurality of NACKs satisfies a threshold.

Aspect 5: The method of any of aspects 1 through 4, wherein the NACK is associated with NACK bits, and a percentage of bits transmitted over the uplink control channel corresponding to NACK bits satisfies a threshold.

Aspect 6: The method of any of aspects 1 through 5, wherein the NACK and the one or more semi-persistent CSI measurement occasions associated with the one or more CSI-RSs are separated by a quantity of symbols based at least in part on a processing time of the base station.

Aspect 7: The method of any of aspects 1 through 6, further comprising: receiving, from the base station, a data transmission or a data retransmission based at least in part on the one or more CSI reports, wherein the data transmission or the data retransmission is associated with one or more of an adjusted modulation and coding scheme, an adjusted precoding matrix indicator, or an adjusted rank indicator based at least in part on the one or more CSI reports.

Aspect 8: A method of wireless communication performed by a base station, comprising: receiving, from a user equipment (UE) via an uplink control channel, a negative acknowledgement (NACK) when a downlink shared channel transmission is not successfully received at the UE; transmitting, to the UE and based at least in part on the NACK, one or more channel state information reference signals (CSI-RSs) at one or more semi-persistent CSI measurement occasions; and receiving, from the UE, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs.

Aspect 9: The method of aspect 8, further comprising: transmitting, to the UE, a medium access control (MAC) control element (CE) that activates a plurality of semi-persistent CSI occasions including: the one or more semi-persistent CSI measurement occasion; and the one or more semi-persistent CSI reporting occasions corresponding to the one or more semi-persistent CSI measurement occasions.

Aspect 10: The method of aspect 9, further comprising: transmitting, to the UE, a parameter that defines a quantity associated with the plurality of semi-persistent CSI occasions.

Aspect 11: The method of any of aspects 8 through 10, wherein the NACK is included in a plurality of NACKs transmitted over the uplink control channel, and a number associated with the plurality of NACKs satisfies a threshold.

Aspect 12: The method of any of aspects 8 through 11, wherein the NACK is associated with NACK bits, and a percentage of bits transmitted over the uplink control channel corresponding to NACK bits satisfies a threshold.

Aspect 13: The method of any of aspects 8 through 12, wherein the NACK and the one or more semi-persistent CSI measurement occasions associated with the one or more CSI-RSs are separated by a quantity of symbols based at least in part on a processing time of the base station.

Aspect 14: The method of any of aspects 8 through 13, further comprising: modifying, based at least in part on the one or more CSI reports, one or more of a modulation and coding scheme (MCS), a precoding matrix indicator (PMI), or a rank indicator (RI).

Aspect 15: The method of aspect 14, further comprising: performing, with the UE, a data transmission or a data retransmission based at least in part on one or more of the MCS, the PMI, or the RI.

Aspect 16: An apparatus for wireless communication at a device, comprising a processor; memory coupled with the processor; and instructions stored in the memory and executable by the processor to cause the apparatus to perform the method of one or more aspects of aspects 1-15.

Aspect 17: A device for wireless communication, comprising a memory and one or more processors coupled to the memory, the memory and the one or more processors configured to perform the method of one or more aspects of aspects 1-15.

Aspect 18: An apparatus for wireless communication, comprising at least one means for performing the method of one or more aspects of aspects 1-15.

Aspect 19: A non-transitory computer-readable medium storing code for wireless communication, the code comprising instructions executable by a processor to perform the method of one or more aspects of aspects 1-15.

Aspect 20: A non-transitory computer-readable medium storing a set of instructions for wireless communication, the set of instructions comprising one or more instructions that, when executed by one or more processors of a device, cause the device to perform the method of one or more aspects of aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting, to a base station via an uplink control channel, a negative acknowledgement (NACK) when a downlink shared channel transmission is not successfully received at the UE;
   receiving, from the base station and based at least in part on the NACK, one or more channel state information reference signals (CSI-RSs) at one or more semi-persistent CSI measurement occasions; and
   transmitting, to the base station, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs.

2. The method of claim 1, further comprising:
   receiving, from the base station, a medium access control (MAC) control element (CE) that activates a plurality of semi-persistent CSI occasions including:
      the one or more semi-persistent CSI measurement occasions; and
      the one or more semi-persistent CSI reporting occasions corresponding to the one or more semi-persistent CSI measurement occasions.

3. The method of claim 2, further comprising:
   receiving, from the base station, a parameter that defines a quantity associated with the plurality of semi-persistent CSI occasions.

4. The method of claim 1, wherein the NACK is included in a plurality of NACKs transmitted over the uplink control channel, and a number associated with the plurality of NACKs satisfies a threshold.

5. The method of claim 1, wherein the NACK is associated with NACK bits, and a percentage of bits transmitted over the uplink control channel corresponding to NACK bits satisfies a threshold.

6. The method of claim 1, wherein the NACK and the one or more semi-persistent CSI measurement occasions associated with the one or more CSI-RSs are separated by a quantity of symbols based at least in part on a processing time of the base station.

7. The method of claim 1, further comprising:
   receiving, from the base station, a data transmission or a data retransmission based at least in part on the one or more CSI reports, wherein the data transmission or the data retransmission is associated with one or more of an adjusted modulation and coding scheme, an adjusted precoding matrix indicator, or an adjusted rank indicator based at least in part on the one or more CSI reports.

8. A method of wireless communication performed by a base station, comprising:
   receiving, from a user equipment (UE) via an uplink control channel, a negative acknowledgement (NACK) when a downlink shared channel transmission is not successfully received at the UE;
   transmitting, to the UE and based at least in part on the NACK, one or more channel state information reference signals (CSI-RSs) at one or more semi-persistent CSI measurement occasions; and
   receiving, from the UE, one or more CSI reports at one or more semi-persistent CSI reporting occasions corresponding to the one or more semi-persistent CSI measurement occasions, wherein the one or more CSI reports includes one or more channel measurements based at least in part on the one or more CSI-RSs.

9. The method of claim 8, further comprising:
   transmitting, to the UE, a medium access control (MAC) control element (CE) that activates a plurality of semi-persistent CSI occasions including:
      the one or more semi-persistent CSI measurement occasions; and
      the one or more semi-persistent CSI reporting occasions corresponding to the one or more semi-persistent CSI measurement occasions.

10. The method of claim 9, further comprising:
    transmitting, to the UE, a parameter that defines a quantity associated with the plurality of semi-persistent CSI occasions.

11. The method of claim 8, wherein the NACK is included in a plurality of NACKs transmitted over the uplink control channel, and a number associated with the plurality of NACKs satisfies a threshold.

12. The method of claim 8, wherein the NACK is associated with NACK bits, and a percentage of bits transmitted over the uplink control channel corresponding to NACK bits satisfies a threshold.

13. The method of claim 8, wherein the NACK and the one or more semi-persistent CSI measurement occasions associated with the one or more CSI-RSs are separated by a quantity of symbols based at least in part on a processing time of the base station.

14. The method of claim 8, further comprising:
modifying, based at least in part on the one or more CSI reports, one or more of a modulation and coding scheme (MCS), a precoding matrix indicator (PMI), or a rank indicator (RI).

15. The method of claim 14, further comprising:
performing, with the UE, a data transmission or a data retransmission based at least in part on one or more of the MCS, the PMI, or the RI.

16. A user equipment (UE) for wireless communication, comprising:
a memory; and
one or more processors coupled to the memory, wherein the one or more processors are configured to:
transmit, to a base station via an uplink control channel, a negative acknowledgement (NACK) when a downlink shared channel transmission is not successfully received at the UE;
receive, from the base station and based at least in part on the NACK, one or more channel state information reference signals (CSI-RSs) at one or more semi-persistent CSI measurement occasions; and
transmit, to the base station, one or more CSI reports at one or more semi-persistent CSI reporting occasions corresponding to the one or more semi-persistent CSI measurement occasions, wherein the one or more CSI reports include one or more channel measurements based at least in part on the one or more CSI-RSs.

17. The UE of claim 16, wherein the one or more processors are further configured to:
receive, from the base station, a medium access control (MAC) control element (CE) that activates a plurality of semi-persistent CSI occasions including:
the one or more semi-persistent CSI measurement occasions; and
the one or more semi-persistent CSI reporting occasions corresponding to the one or more semi-persistent CSI measurement occasions.

18. The UE of claim 17, wherein the one or more processors are further configured to:
receive, from the base station, a parameter that defines a quantity associated with the plurality of semi-persistent CSI occasions.

19. The UE of claim 16, wherein the NACK is included in a plurality of NACKs transmitted over the uplink control channel, and a number associated with the plurality of NACKs satisfies a threshold.

20. The UE of claim 16, wherein the NACK is associated with NACK bits, and a percentage of bits transmitted over the uplink control channel corresponding to NACK bits satisfies a threshold.

21. The UE of claim 16, wherein the NACK and the one or more semi-persistent CSI measurement occasions associated with the one or more CSI-RSs are separated by a quantity of symbols based at least in part on a processing time of the base station.

22. The UE of claim 16, wherein the one or more processors are further configured to:
receive, from the base station, a data transmission or a data retransmission based at least in part on the one or more CSI reports, wherein the data transmission or the data retransmission is associated with one or more of an adjusted modulation and coding scheme, an adjusted precoding matrix indicator, or an adjusted rank indicator based at least in part on the one or more CSI reports.

23. A base station for wireless communication, comprising:
a memory; and
one or more processors coupled to the memory, wherein the one or more processors are configured to:
receive, from a user equipment (UE) via an uplink control channel, a negative acknowledgement (NACK) when a downlink shared channel transmission is not successfully received at the UE;
transmit, to the UE and based at least in part on the NACK, one or more channel state information reference signals (CSI-RSs) at one or more semi-persistent CSI measurement occasions; and
receive, from the UE, one or more CSI reports at one or more semi-persistent CSI reporting occasions corresponding to the one or more semi-persistent CSI measurement occasions, wherein the one or more CSI reports includes one or more channel measurements based at least in part on the one or more CSI-RSs.

24. The base station of claim 23, wherein the one or more processors are further configured to:
transmit, to the UE, a medium access control (MAC) control element (CE) that activates a plurality of semi-persistent CSI occasions including:
the one or more semi-persistent CSI measurement occasions; and
the one or more semi-persistent CSI reporting occasions corresponding to the one or more semi-persistent CSI measurement occasions.

25. The base station of claim 24, wherein the one or more processors are further configured to:
transmit, to the UE, a parameter that defines a quantity associated with the plurality of semi-persistent CSI occasions.

26. The base station of claim 23, wherein the NACK is included in a plurality of NACKs transmitted over the uplink control channel, and a number associated with the plurality of NACKs satisfies a threshold.

27. The base station of claim 23, wherein the NACK is associated with NACK bits, and a percentage of bits transmitted over the uplink control channel corresponding to NACK bits satisfies a threshold.

28. The base station of claim 23, wherein the NACK and the one or more semi-persistent CSI measurement occasions associated with the one or more CSI-RSs are separated by a quantity of symbols based at least in part on a processing time of the base station.

29. The base station of claim 23, wherein the one or more processors are further configured to:
modify, based at least in part on the one or more CSI reports, one or more of a modulation and coding scheme (MCS), a precoding matrix indicator (PMI), or a rank indicator (RI).

30. The base station of claim 29, wherein the one or more processors are further configured to:
perform, with the UE, a data transmission or a data retransmission based at least in part on one or more of the MCS, the PMI, or the RI.

* * * * *